United States Patent [19]
Melvin

[11] 3,826,894
[45] July 30, 1974

[54] SPOT WELDING APPARATUS FOR WELDING END CONDUCTORS IN CYLINDRICAL ELECTRICAL MACHINE ELEMENTS

[75] Inventor: Raymond C. Melvin, Elm Grove, Wis.

[73] Assignee: Harnischfeger Corporation, W. Milwaukee, Wis.

[22] Filed: June 6, 1973

[21] Appl. No.: 367,552

[52] U.S. Cl. ............ 219/124, 29/205 CM, 29/597, 219/127, 219/137
[51] Int. Cl. .............................................. B23k 9/12
[58] Field of Search ........... 219/124, 125, 127, 137, 219/78, 79, 80, 85, 159; 29/597, 205 CM; 228/4, 148

[56] References Cited
UNITED STATES PATENTS

| | | | |
|---|---|---|---|
| 2,400,902 | 5/1946 | Allen | 219/85 X |
| 2,495,044 | 1/1950 | Williams | 219/8 C |
| 3,045,103 | 7/1962 | Warner | 219/78 |
| 3,519,790 | 7/1970 | Heller | 29/597 X |

Primary Examiner—C. L. Albritton
Attorney, Agent, or Firm—James E. Nilles

[57] ABSTRACT

A spot welding apparatus connects the coil end strips to commutating bars of an armature. A fixture has a rotating base supporting the armature at the end opposite the commutator. An adjustable top support locates a spot welding torch in proper alignment to the bar and with a spring loaded ground slidably engaging the same bar. The torch includes a two percent thoriated tungsten electrode having a tapered or pencilled tip terminating in a blunt or flat end. A high frequency, constant potential D.C. power supply is connected to the torch and maintains power instantly available to the electrode and ground under the control of a timer. A helium shield arc is created. A position sensor carried by the top support has a pair of conductive plungers axially aligned with and slidably engaging with the commutator bars to produce an on-off control as the plungers pass over an insulator between the bars. The sensor is connected to actuate the timer which operates the power supply to strike an arc for a predetermined time. A plurality of radially distributed spot welds are provided on each bar by a series of traverses or passes about the commutator. The ends of the coils of a wound rotor may also be similarly joined by spot welds automatically created by the method and apparatus.

25 Claims, 13 Drawing Figures

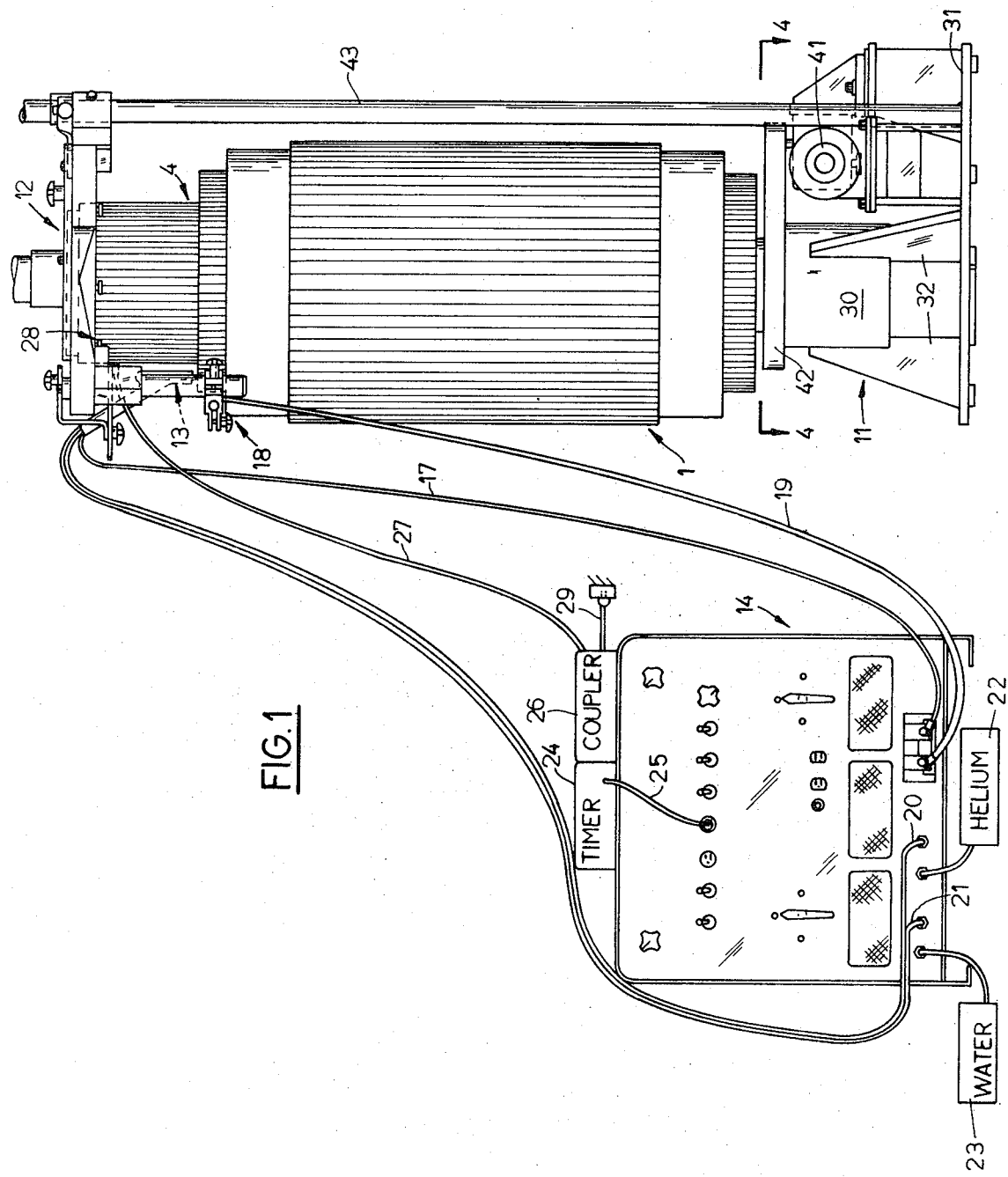

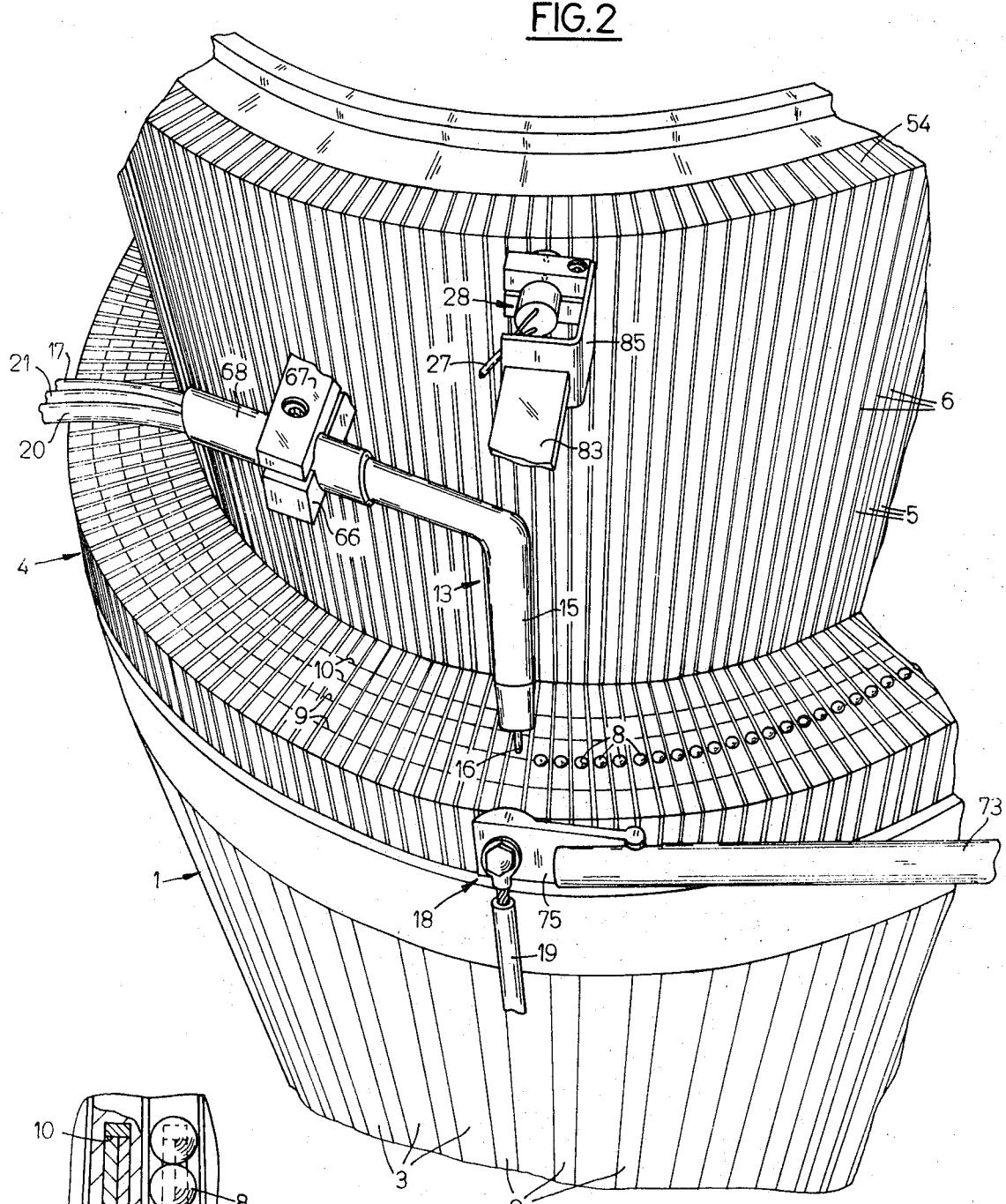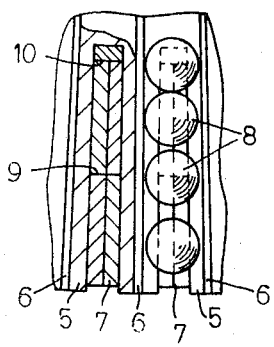

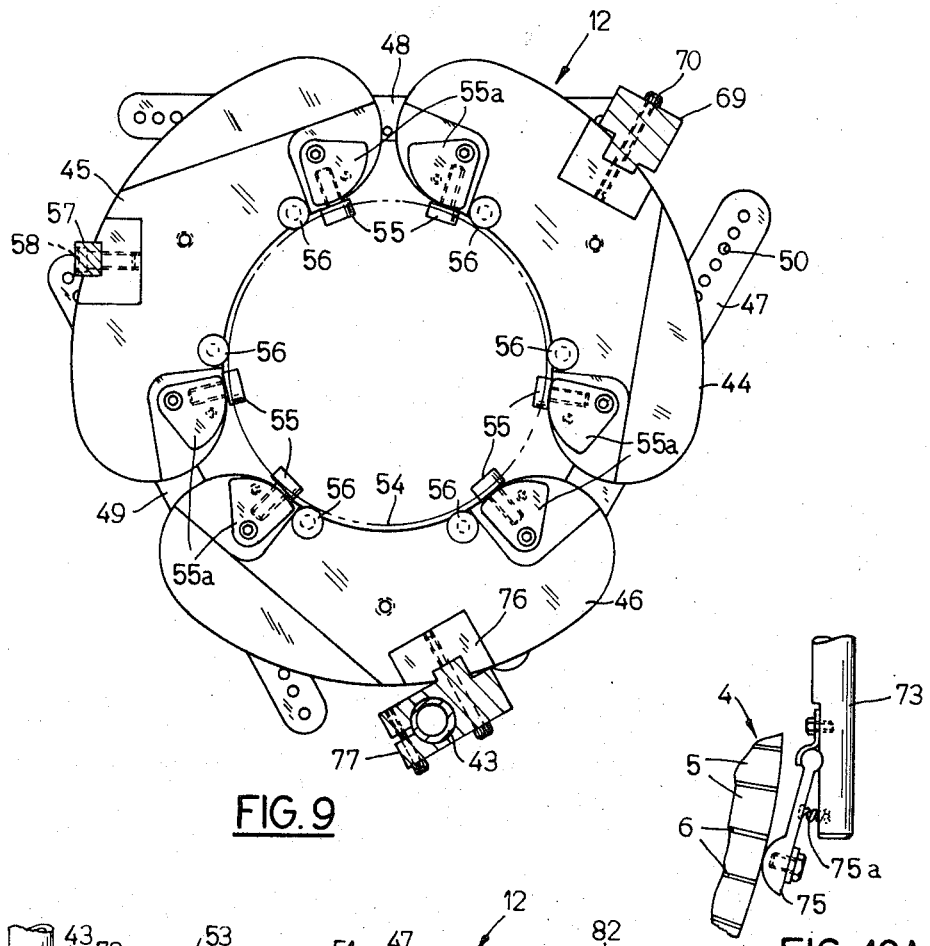
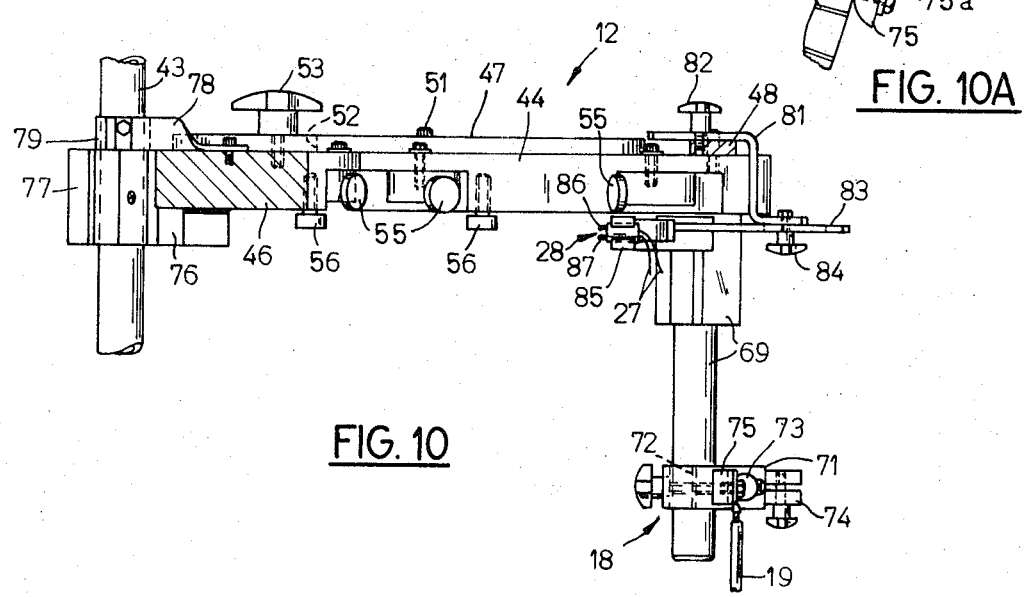
FIG. 9
FIG. 10A
FIG. 10

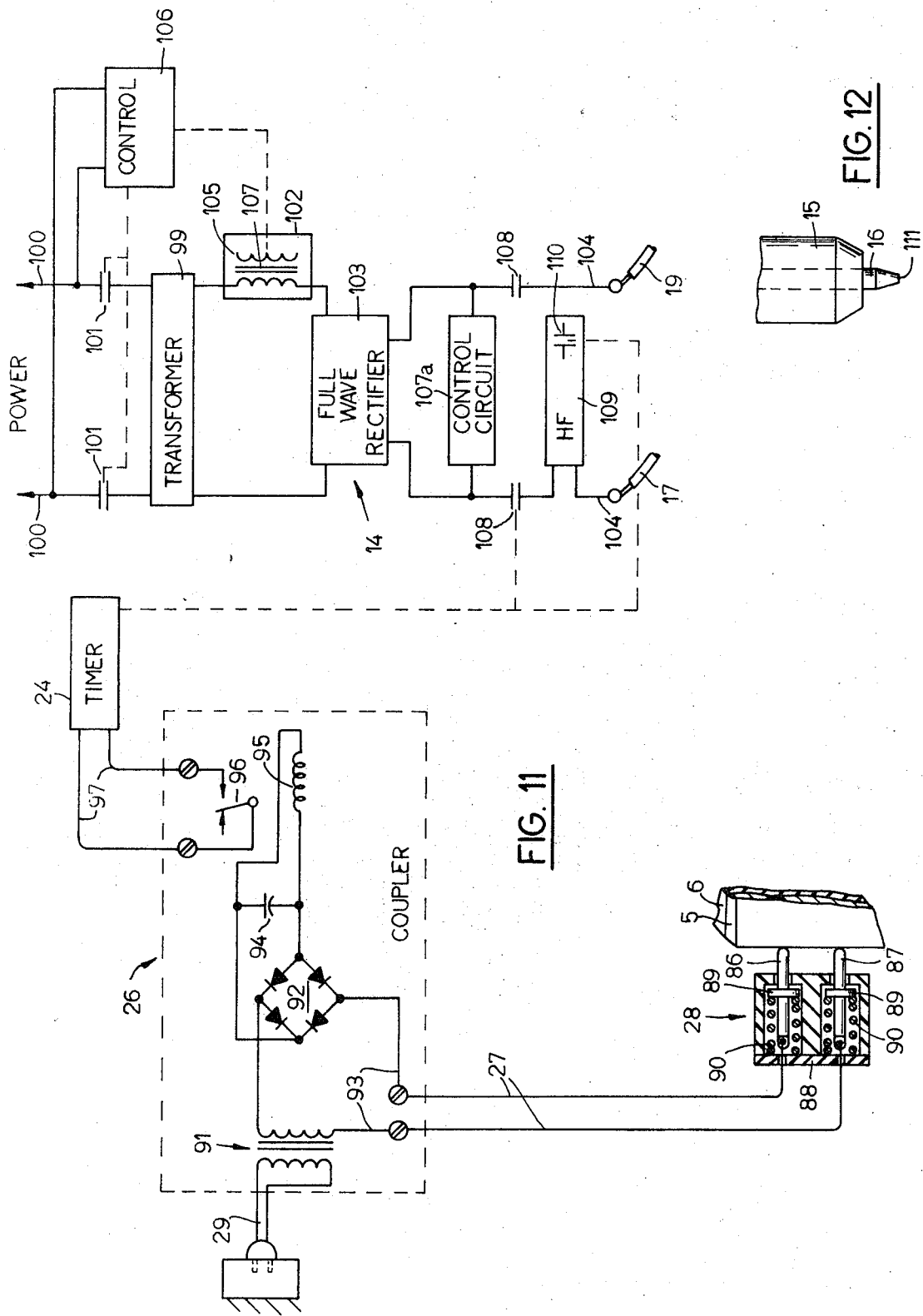

SPOT WELDING APPARATUS FOR WELDING END CONDUCTORS IN CYLINDRICAL ELECTRICAL MACHINE ELEMENTS

BACKGROUND OF THE INVENTION

This invention relates to a spot welding method and apparatus for welding of end conductors of electric machine cylindrical elements and particularly the end lead means of coils forming a part of a dynamo electric machine rotor element.

Various electrical rotating elements employ axially extended coils embedded within a cylindrical magnetic core. The ends of the coils are interconnected to provide predetermined magnetic characteristics. In particular, motors for generators and motors provide for interconnection of the coil ends to suitable electrical contacting elements. For example, in armatures, various wound rotors and the like copper conductors in the rotor slots are connected to a commutating or collecting contact means on the one end of the rotor. In wound rotors, the end lead means are soldered together and connected to suitable collector rings. An armature commutator includes a plurality of circumferentially distributed commutator bars separated by suitable mica or similar insulators. The commutator generally extends axially of the rotor to define a circumferential surface for contacting of suitable brush means. The commutating bars are generally L-shaped members having relatively short radial projections immediately adjacent the magnetic core with the conductors or the coil ends connected to such projections. In particular the commutating bars may be conveniently split or slotted. The coil conductors then terminate in copper coil strips which project into the split connection means defined by the radially extending commutating bar. The strips are conventionally soldered to the commutating bar using a conventional acid and solder process. Although such systems have been widely and satisfactorily employed, the method presents certain practical problems particularly in connection with the relatively circumferentially narrow commutating strips which may be required in certain armatures and other rotor elements. Thus, the connection must not only provide good electrical characteristics, but must also provide very good physical characteristics for practical commercial application.

SUMMARY OF THE PRESENT INVENTION

The present invention is particularly directed to an apparatus and method for welding of the end coils of a cylindrical element to a contact means such as the commutator or the like. Generally, in accordance with the present invention the coil ends are connected to the contact with the ends and the contacts having a common exposed surface. The exposed surfaces are joined by spot welding employing a non-consumable spot welding torch which traverses the plane of the exposed leads and contact means. The torch means is intermittently operated in synchronism with alignment to each coil ends. In connection of conventional coil leads such as the coil strips to copper commutating bars, the applicant has found that gas tungsten arc spot welding employing pure helium produces optimum results.

In accordance with a further novel and particular feature of the construction of the present invention, the rotor element is mounted within a suitable supporting fixture. The fixture further includes a support means for the spot welding torch means, with interrelated control means to establish relative movement between the torch means and the rotor elements. An automatic control means is coupled to sense the position or the alignment of the torch means and is coupled to operate or activate the torch means for a predetermined time. In this manner, the several end connections are automatically sequentially welded. The power supply to the torch means is preferably a high frequency constant potential power supply of suitable construction.

In accordance with a particularly novel construction of the present invention as applied to the welding of the coil end strips to the commutating bars, a fixture included a means to support the armature at the end opposite the connutator. A torch and work support was provided at the commutator end. The support included a plurality of adjustable elements interconnected to accommodate various sized rotor elements. It was further constructed to permit convenient attachment and removal for replacement and sequential introduction of armatures into the fixture.

The support included a first adjustable means for locating of a gas tungsten arc spot welding torch with an electrode in alignment with the connection leg of the commutator. The torch included a two percent thoriated tungsten electrode having a tapered or pencilled tip terminating in a blunt or flat end. In a practical application, the blunt end will vary between 1/32 and 1/16 inches in accordance with the particular diameter of the tungsten electrode which in turn will be related to the size of the spot weld required. A power supply was provided and connected to the torch means with means for supplying a proper constant potential welding supply under the control of a timer. The supply also included means to supply the inert gas which most satisfactorily was 100 percent helium. A ground return was supported by the supporting fixture and included a sliding contact engaging the commutating bars in alignment with the electrode. Further, the ground was located immediately adjacent to the connection leg so as to minimize the distance between the electrode and the ground return.

In accordance with a further feature of that construction, the timer was controlled from a sensing element carried by the support and having sensing means aligned with a single commutating bar with the torch means aligned with a commutating bar. A particular sensor employs a pair of conductive sensitive plunger elements axially aligned with the armature. The plunger elements are biased outwardly into sliding engagement with the commutator. The sensing means was accurately located such that it was aligned with a commutating bar whenever the torch means was appropriately located with the same or a different commutating bar for effecting of the desired spot weld.

Further, in order to insure reliable, firm electrical and physical interconnection between the coil ends and the contact means, a plurality of radially distributed spot welds are preferably employed. They may be established by a series of traverses or passes about the contact means.

Applicant has found that the spot welding provides a reliable method and apparatus for interconnecting of the coil ends or armature bar ends to the end connecting means. Thus, as applied to a rotor with the connection of the coil ends to a collector, the invention eliminates the conventional requirement of protecting the coil ends with suitable wet insulations as well as the associated water spraying required for soldering or solid welding. This has the further advantage of eliminating the further process time and expense of unpacking the coils and baking the rotor to eliminate the moisture from the rotor as a result of the conventional methods.

Further, with the system employing the automatic fixturing the required technical skill is minimized and personnel can be readily instructed in and satisfactory spot weld the rotor elements.

The present invention thus provides a simple, reliable, and relatively inexpensive means of providing improved connection between the end coil connections of rotors, armatures, and like elements.

BRIEF DESCRIPTION OF DRAWINGS

The drawings furnished herewith illustrate a preferred construction of the present invention in which the above advantages and features are clearly illustrated as well as others which will be readily understood from the following description of such embodiment.

In the Drawings:

FIG. 1 is a side elevational view of an armature mounted within a fixture constructed in accordance with the present invention and connected to a welding supply for effectively spot welding commutating bars to end rotor coil strips;

FIG. 2 is an enlarged fragmentary pictorial view illustrating the commutator structure and the mounting of the torch means, the ground return, and a position sensing control means;

FIG. 3 is an enlarged fragmentary plan view illustrating the connection leg portion of a pair of commutating bars;

FIG. 9 is a bottom view of the top support structure as shown in FIG. 7;

FIG. 10 is a sectional view taken generally on line 10—10 in FIG. 7;

FIG. 10(a) is a fragmentary enlarged view of the end of the ground return unit shown in FIGS. 2 and 10;

FIG. 11 is a schematic circuit of a power supply and timing control for the welding; and FIG. 12 is an enlarged fragmentary view illustrating the preferred tip construction for the electrode.

DESCRIPTION OF ILLUSTRATED EMBODIMENT

Figure 4:
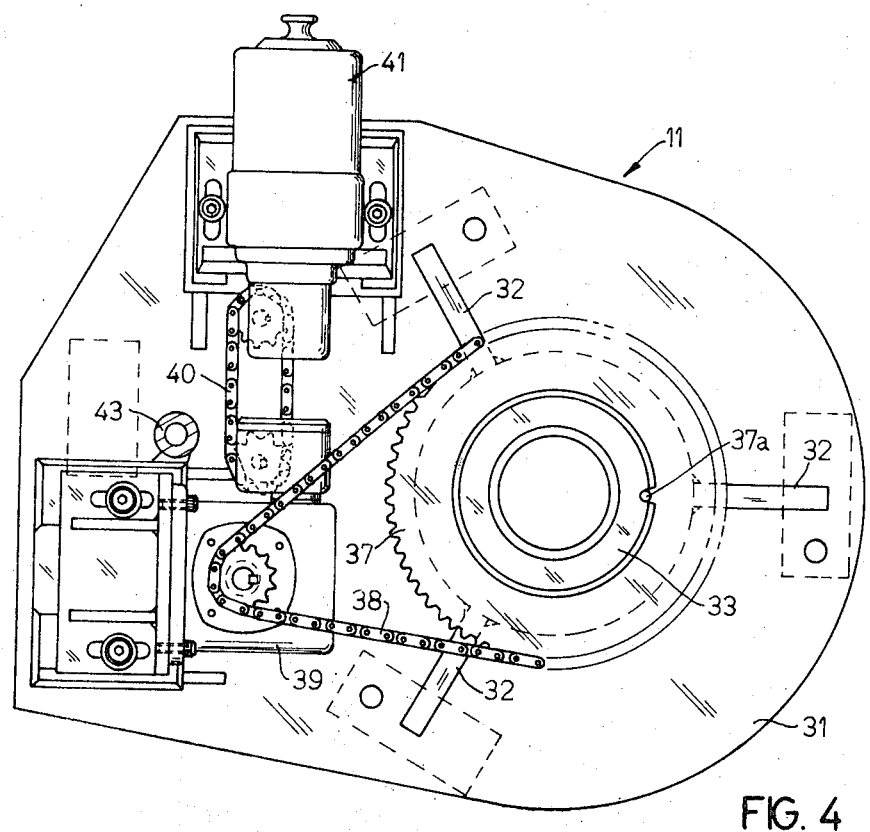
FIG. 4 is a top plan view of the base supporting structure shown in FIG. 1 and generally taken on line 4—4 of FIG. 1.

Referring to the drawings and particularly to FIGS. 1 - 3 inclusive, a spot welding method and apparatus constructed in accordance with the present invention is shown applied to an armature 1. The armature includes a plurality of armature coil sides or conducting bars embedded within and extending axially of a magnetic core 3 within suitable slots and connected at the one end to a commutator 4. In the illustrated construction, the commutator 4 is of an essentially conventional basic construction employing a plurality of relatively circumferentially narrow L-shaped commutating bars 5 separated by similar shaped insulators 6 of mica or other suitable material. As most clearly shown in FIG. 3, each of the L-shaped bars has the radial connection portions or means immediately adjacent to the core formed as a split connection leg with a plurality of end strips 7 extending through the split or slot and terminating in the common plane defined by the circumferential and radial extension of the inter-spaced insulators. In accordance with the present invention, the coil strips 7 are welded to the corresponding commutator bar 5 by one or more spot welds 8 applied directly to the exposed strip ends and thus in the common plane of the connection legs. In actual practice, the connection is provided by a plurality of radially spaced spot welds in accordance with the number of strip ends. The spot welds each span the commutating bar and extend radially to almost form a continuous weld. They are applied by separate, sequential traversing of the connection portions along radially spaced circumferential weld lines 9 and 10 to minimize the heat build up in the connection area.

The fixture includes a bottom or lower support assembly 11 which is adapted to receive the armature 1 and for rotatable mounting thereof. The fixture further includes a top support assembly 12 interconnected to the lower assembly, as hereinafter described. The top support assembly 12 separately supports a weld gun assembly 13 for traversing of the common connection plane formed by the connection leg portions. A welding power supply 14 of a suitable construction is provided to selectively energize the weld gun assembly 13 and form the spot weld 8.

The weld gun assembly 13 includes an electrode torch 15 including a non-consumable electrode 16 connected via a power cable 17 to an output terminal of a welding or power supply 14. A ground return assembly 18 is further supported by the top support 12 and connected by a ground return cable 19 to the opposite side of the power supply 14. The power supply and welding gun assembly in an optimum construction defines a gas tungsten arc spot welding system employing high frequency D.C. constant potential source with a shielding gas to protect the spot welding arc established to produce the spot welds 8. In the illustrated embodiment a gas line 20 and a water line 21 are shown interconnected between the welding supply 14 and the torch 15. The gas line 20 is connected through the apparatus to a source of a suitable shielding gas 22. In accordance with the present invention, applied to the connection of a copper end strips 7 to copper commutating bars 5, applicant has found that the source 22 is preferably pure helium. Although argon and combinations of helium and argon are widely employed in tungsten gas arc spot welding and may be employed, pure helium has been found to contrubute to a hotter arc with the result of reduction in arc time and improved spot profile. The water line 21 is connected to a suitable water source 23 through the supply 14. Thus the interconnection of the gas source 22 and the water source 23 through the power supply 14 permits the selective application of the torch cooling water and the protective gas to the arc in synchronism with the striking of the arc in accordance with well known practice. In accordance with a further feature of the illustrated embodiment of the invention, the welding supply 14 is selectively activated from a timer 24 which is connected via an input cable 25 to a separate power connection from the welding supply to assist in isolation from the high frequency. The welding supply is selected to internally establish and maintain a suitable constant potential for instant application between the electrode 16 and the ground assembly 18 for producing satisfactory spot welds 8. The timer 24 is operative to complete the connection between such constant potential power and the electrode for a predetermined time. In the illustrated embodiment of the invention, a timing control coupler 26 provides an input to initiate the operation of the timer 24 which will automatically initiate the striking of the arc for a predetermined, preset time. The coupler 26 is connected via a control or timer cable 27 to a special sensing unit 28 carried by the top support 12. The sensing unit 28 is coupled to the commutator 4 and selectively senses the sequential movement of the torch means 13 into alignment with a new commutator bar 5 to energize the coupler 26 and thereby activate the timer 24 to initiate the spot welding arc. In the illustrated embodiment of the invention, the sensing unit 28 is coupled to control the transfer of power to the timer 24. The coupler 26 in turn derives power from a separate power connection 29.

Thus, in operation the armature 1 is mounted within the fixture for continuous rotation with respect to the torch welding assembly 13 and particularly the torch 15. The welding supply 14 is energized and the continuous movement of the armature results in the automatic corresponding sequential activation of the timer 24 via the sensing unit 28 to produce the desired spot weld 8 along a predetermined weld line 9 or 10.

Figure 5:
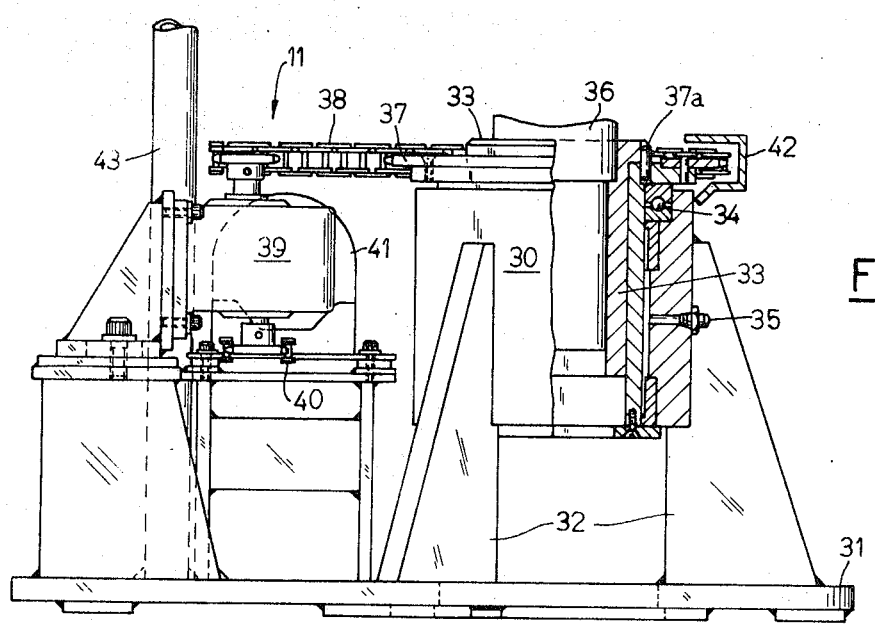
FIG. 5 is a front elevational view of the base structure as shown in FIG. 4.

More particularly, in the illustrated embodiment of the invention, the fixture and particularly the lower support unit 11 of the fixture as illustrated in FIGS. 1, 4 and 5 includes a vertical cylindrical journal or support 30 connected to a base plate or support structure 31. Suitable strengthening plates 32 may be provided between the journal 30 and the base plate 31 as illustrated. A rotatable driven sleeve bearing 33 is located within the journal 30 and rotatably supported therein by a suitable roller type thrust bearing 34. A grease fitting 35 provides for lubrication of the rotating journal. The journal is selectively replacable to accommodate various rotor shafts 36 such that the single lower support structure can be employed with various sized armatures, rotor elements, and the like.

The upper end of the journal 30 is releasably coupled to a ring gear 37 and any suitable means as by coupling pins 37a. A horizontal drive chain 38 connects the gear to a suitable speed reducer 39, the input of which is connected via a chain drive 40 to a drive motor 41. The energization of the motor 41 provides for continuous rotation of the journal the speed of which is determined by the circumferential spacing of the commutator bars 4. A suitable cover 42 may of course be applied over the chain structure to enclose it and protect it from the surrounding environment or the like.

Thus, the armature 1 is rotatably mounted within the fixture for traverse with respect to the top support assembly 12.

The top support assembly 12 is interconnected and located relative to the lower base assembly 11 through an interconnecting support rod 43 which extends vertically upwardly from the side of the assembly 11 and thus to one side of the fixture 12.

Figure 6:
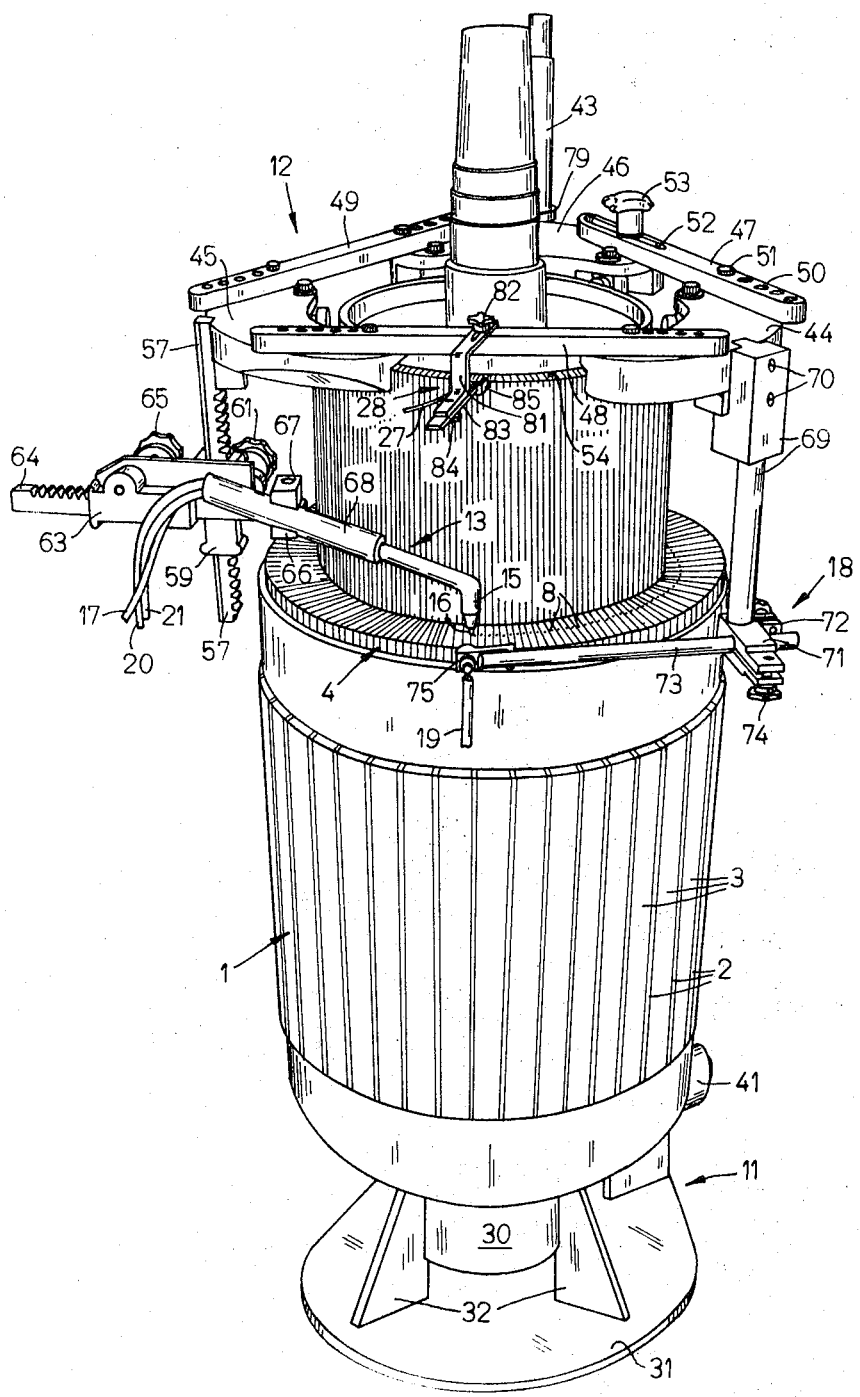
FIG. 6 is an enlarged, pictorial view of the armature mounted within the supporting structure and illustrating the upper support structure of the fixture.
Figures 7, 8:
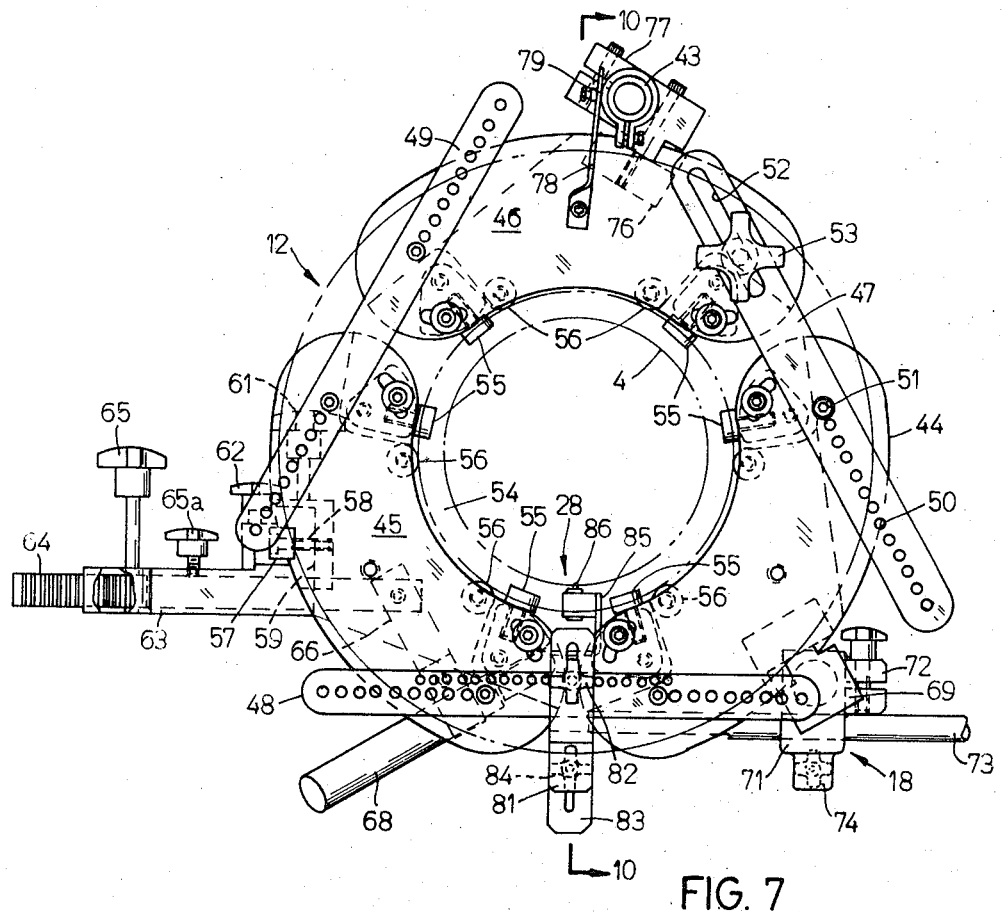
FIG. 7 is a top view of the top support structure shown in FIGS. 1, 2 and 6.
FIG. 8 is a side elevational view of the top support unit as shown in FIG. 7.

The illustrated top support assembly 12, as most clearly shown in FIGS. 6 through 10 inclusive, includes three circumferentially distributed arcuate support brackets or plates 44, 45 and 46 interconnected by circumferential adjustment connecting links 47, 48 and 49. The arcuate plate 44 supports the ground assembly 18. The arcuate plate 45 supports the welding gun assembly 13 while the support plate 46 is connected to the support rod 43 to properly locate the top support assembly 12 as a unit. The several links are similarly constructed and most clearly shown in FIG. 7 to permit adjustment of assembly 12 for various upper diameters, for example, to a larger size. Thus, the link 47 which is shown interconnecting of the ground plate 44 to the support plate 46 includes a plurality of openings 50 in the one end to permit selective alignment of one of the openings with the corresponding opening in the plate 44 and attachment thereto by a suitable attachment bolt 51. The opposite end of the link 47 is provided with an elongated slot 52 overlying an opening in the plate 46. The link 47 is attached to the link 46 by an attachment bolt unit 53 having a hand knob to permit ready clamping and release of the link 47. The other links 48 and 49 are similarly constructed with end openings only to permit interconnection in fixed relation to the respective plates 44 and 46 as illustrated in FIG. 7. The quick release bolt unit 53 is provided to permit the quick release of the link 47 to permit the swinging opening of the several plates with respect to the rotating armature for the sequential introduction of the armatures for processing within the fixture.

Thus, the several plates are interconnected to encircle the armature and particularly the upper end 54 of the commutating bars 5, which defines a suqport for such plates during the operation of the apparatus. This thus minimizes the loading of the support structure during the operation.

In the illustrated embodiment of the invention each of the plates 44 – 46 is similarly supported. In particular, referring to the plate 44 as illustrated in FIGS. 7 and 9, a first pair of circumferentially spaced wheels 55 are provided on the inner periphery of the plate 44. The wheels are shown attached to the under-surface of the plate by suitable clamping plates 55a and with a horizontal axis of rotation. The wheels are located circumferentially and vertically to rest on the upper end 54 of the commutating bars 5. This thus provides a vertical support for the top support assembly 12. In addition, a second pair of circumferentially distributed wheels 56 are also secured to the undersurface of the plate 44. The second pair of wheels or rollers 56 have a vertical axis of rotation and are located to engage the upper peripheral portions of the commutator bars 5 and particularly immediately below and adjacent to the upper end 54. This thus provides a very stable support for the upper end of the armature as well as supporting of the top support assembly 12 in the vertical direction.

As most clearly shown in FIGS. 6, 7 and 8, the welding gun assembly 13 is supported and properly located by adjustable interconnection to the plate 45.

In particular, a vertical rack 57 is secured to the periphery of plate 45 by suitable attachment bolt or bolts 58. A generally L-shaped follower housing 59 is slidably supported upon the depending rack 57. A positioning gear 60 is journalled within the housing 59 in mesh with the rack 57 as most clearly shown in FIG. 8. An operator hand knob 61 is coupled to the gear to permit selective positioning of the housing on the vertical rack 57. A manually operated lock shaft unit 62 is provided immediately adjacent to the gear 60 and is adapted to project through the housing 59 and bear on the rack 57 to vertically lock the follower 59 to the rack 57 and thereby provide for corresponding vertical positioning of a horizontal outward extension 63 of the follower housing 59. A horizontal rack 64 is slidably mounted within the housing portion 63. A similar hand actuated gear positioning unit 65 is provided in the housing portion 63 for selective positioning of the rack 64 with respect to the housing. A lock unit 65a provides for locking of the rack 64 in selected horizontal positioning.

The outer end of the rack 64 is provided with a pair of clamping and mounting block members 66 and 67 which are bolted to each other and adapted to firmly grasp the handle portion 68 of the torch 15 therebetween to provide for a firm and stable mounting of the torch 15. The clamping permits the accurate placement of the torch and particularly the electrode 16 for sequential alignment with the several commutator bars 5 as previously discussed.

To provide a return path for the arc, the ground assembly 18 is properly supported in proper alignment with the electrode 16 upon the plate 44. Thus, referring particularly to FIGS. 6, 7 and 8, a ground mounting block or arm 69 is bolted or otherwise attached to the periphery of the plate 44, as by bolts 70. The arm 69 depends downwardly therefrom into alignment with the periphery of the connection leg portion of the commutator 4. An adjustable mounting bracket 71 is secured to the lower end portion of the arm 69 and includes a rotating split clamp 72 attaching the bracket to the arm 69 for selective angular placement with respect to the armature. A horizontal support shaft 73 is secured in the bracket 71 by a similar split clamp unit 74. The shaft 73 extends horizontally from the bracket which is located to position the horizontal shaft 73 extending over the end connection portion of the commutator and with the outer end spaced outwardly from and generally in alignment with the torch 16. A sliding copper or other suitable conductive contact 75 is pivotally secured to the outer end of the shaft 73. The contact 75 is connected by a suitable bolted connection to the ground return cable 19. The contact 75 is biased by a spring 75a to bear on the axial periphery of the connecting portion of the commutator 4 to provide a firm sliding electrical contact therebetween. It is furher located to provide a very precise alignment with the electrode 16 such that when the arc is struck, a current return path of minimum length is established through the commutating bar 5 which is then being welded.

Further, the ground contact 75 is preferably provided with the conventional curved face to produce a relatively line type contact with the commutating bar 5. Thus, by proper location of the top support assembly 12 on the upper end of the armature 1 and by proper location of the assembly 18 and the torch assembly 13, the apparatus is located to establish sequential spot welds 8.

The top support unit 12 is properly secured to support block 76 which is secured to the upper end of the support rod 43. A split clamp unit 77 interconnects the block 76 to the rod 43. The split clamp unit 77 provides a pivotal support to the shaft 43. A block arm 78 is provided on the connecting link or plate 46 and extends outwardly with a releasable attachment unit 79 to permit locking of the top support assembly to the shaft 43.

The welding supply and particularly the coupler and timer 24 are controlled by the sensing assembly or unit 28 which is most clearly shown in FIGS. 2, 6 and 11, is mounted to engage the upper peripheral portion of the commutator bars immediately adjacent the end 54. Thus, a generally Z-shaped bracket 81 has one leg connected to the top central portion of the link 48. A quick release clamp bolt unit 82 connected the bracket to the link which is provided with a slot to permit the radial positioning of the sensing unit 28 with respect to the commutator 4. A support strap 83 is similarly connected to the underside of the outward extension of the Z-shaped bracket 81 by a similar small clamp bolt unit 84. This permits the accurate location of the plunger unit immediately adjacent to the periphery of the commutator as shown.

The sensing assembly or unit further includes a small U-shaped mounting support or bracket 85 connected to the inner end of the support strap 83 as most clearly shown in FIG. 2. A pair of sensing contacts 86 and 87 located in vertical alignment or axial alignment with respect to the armature are carried by a suitable insulation housing 88. The contacts 86 and 87 in housing 88 is suitably clamped within the bracket 85 as most clearly shown in FIGS. 2 and 11.

The sensing contacts as most clearly shown in FIG. 11 are small metal plunger units slidably mounted within the housing 88 and having an intermediate shoulder portion 89 urged by a suitable coil spring 90 outwardly of the housing and toward the armature. The shoulders 89 are thus resiliently urged toward abutting stop walls within the housing 88. The outer ends of the plungers or sensing contacts 86 and 87 thus slidably engage the periphery of the commutator 4 immediately adjacent the upper end 54. With the sensing unit aligned with the commutator bar a conductive path is maintained between the contacts 86 and 87.

As the armature rotates the contacts move from one commutator bar 5 to the adjacent commutator bar 5. In so moving they pass over an insulator 6 thus breaking the conductive path between the contacts 86 and 87. The successive breaking and re-establishing of the circuit provides an effective pulse signal to the coupler 26 which in turn operates to reset and re-initiate the operation of the timer 24.

A satisfactory control circuit is shown in FIG. 11 wherein a step down transformer 91 is connected via the power cable 29 to provide a suitable relatively low control voltage. The output of the transformer is connected to a full wave receitier 92 in series with the contacts 86 and 87. Thus, the contacts or the sensing unit is shown connected via the cable 27 to a pair of leads 93 which complete the circuit between the transformer 91 and the one side of the full wave diode rectifier 92. A stabilizing capacitor 94 is connected across the output of the full wave rectifier 92 and parallel with the winding 95 of a control relay. The winding 95 is coupled to control a set of normally open contacts 96 which are in turn connected via a pair of leads 97 directly to control the timer. Thus as the armature moves or rotates it selectively opens and again closes the circuit between the transformer 91 and the rectifier 92 thereby providing timed de-energization of the coil 95. This results in the sequential opening and re-closing of the contacts 96 which in turn resets the timer 24 to effect a predetermined sequential supplying of power via the welding power supply 14 to the welding gun assembly 13.

The power supply 14 may be any suitable unit adapted to establish and maintain a spot welding arc. As previously noted, the supply 14 is preferably a constant potential D.C. supply having a high frequency supply component and such a supply is shown in block diagram in FIG. 11. The illustrated power supply 14 includes a transformer 99 connected to the incoming power lines 100 via suitable contactor contacts 101 to reduce the voltage to suitable level for welding. A saturable reactor 102 is connected in series with a full wave rectifier 103 across the transformer 99 to provide an adjustable constant potential D.C. welding voltage across output lines 104. The contactor for contacts 101 and the current control for the control winding 105 of reactor 102 are actuated by a suitable control unit 106, which will also include various other necessary and desired control means in accordance with usual design requirements well known in the art.

In the present invention, the reactor 102 which necessarily includes an iron core 107 tends to prevent rapid build up of the current, particularly during the initial spot weld of each traverse where the power is turned on and off by opening and closing of contacts 101. After the initial arc is struck, the subsequent arcs may be maintained, if the time period between arcs is not excessively extended so as to allow significant reduction in the magnitization of the core 107.

However, to avoid any possibility, the system is preferably constructed as previously noted to maintain power instantly available. In FIG. 11, the system is so constructed by maintaining contacts 101 closed and providing a circuit 107 across the leads 104 to continuously magnitize the reactor 102. A secondary contactor includes contacts 108 connected in the leads 104 to the output side of the circuit 107a. The contactor for contacts 108 are controlled by the timer 24 which may be of any suitable or desired construction.

The high frequency source 109 is shown connected between the contacts 108 and the connection to the supply connectors which are connected to the electrode and ground cable leads 17 and 19. The high frequency source 109 also preferably includes contacts 110 which are controlled by the timer 24 in synchronism with the secondary contacts 108. The timer 24 is directly connected to the power supply 14. The coupler 26 is however separately connected to power via line 29. Thus, high frequency signals tend to pulse the timer through the coupler, resulting in erroneous circuit operation if the coupler 26 is not suitably isolated or otherwise constructed so as not to respond thereto.

A commercially available welding supply connected as shown in FIG. 11 is identified as model AC/DC 500 HF Welder, manufactured and sold by Chemtron Corp. of Chicago, Ill.

In summary, in the illustrated embodiment of the invention, the armature 1 is mounted within the fixture and particularly within the lower base support assembly 11 in the top support assembly 12 with the weld gun assembly 13 and the ground assembly 18 as well as a sensing unit 28 properly located with respect to the commutator 5. The motor 41 is energized to rotate the armature continuously to sequentially align the torch means and particularly the electrode 16 with the several connection portions of the several commutating bars 5. The sensing unit 28 through the sensing contacts 86 and 87 provides for proper timed energization of the electrode 16 with a simultaneous activation of the supply of water and protective gas to the arc. Each arc is established for a selected time period with the current flowing from the electrode 16 through the connecting portion of the commutator bar and the coil strips 7 to the immediately adjacent ground return assembly contact 75. Applicant has found that armatures can be rapidly spot welded employing amperages in ranges of 125 to 340 amperes depending upon the size of the commutator bars. Each arc is established for approximately 1 to 1½ seconds once again depending on the width of the coil strip and the commutator bars as well as the amperage used. The rotational speed of the armature is directly related to the width of the commutator bars to permit accurate placement of the assembly and formation of spot welds 8.

As applied to the illustrated armature 1 having four coil end strips and an innermost balancing coil end strip, four distinct spot welds 8 were provided in radial spacement on each bar 5. Each spot weld 8 was formed to span the complete bar 5 and even disrupted the adjoining insulator 6 somewhat. Further, the spot welds 8 on each bar 5 closely approached and in some cases, merged to form a more or less continuous connection. The spot welds 8 were thus formed, after which the connection leg was machined to form a flat, planar surface with the inner portions of the welds maintaining the necessary connections. The insulators 6 were then undercut in accordance with conventional practice. The disruption of the insulator occasioned by the welding was such that the usual undercutting resulted in a final commutator with complete, stable insulators.

As previously noted, the present invention preferably employs for optimum results a gas tungsten arc spot welding method and apparatus with pure helium as a protective gas. Further, applicant has found that a two percent thoriated tungsten electrode is preferably employed for welding of copper commutating bars to copper contact strips.

Applicant has further found that the electrodes should have a blunt pencilled and defining a relatively small flat end 111 as most clearly shown in fragmentary view in FIG. 12. If the point is excessively small, it will have a tendency to blow out the copper and disrupt the desired weld. If the end is too blunt, or flat, or has too large of a flat diameter, the arc has a tendency to wander. Thus if is important to properly locate the arc with respect to the connecting strips 7 and the commutator bar 5 without however disrupting the effective weld. Applicant has found that in a practical application the tip is preferably formed with a diameter of 1/32 to 1/16 of an inch in accordance with the particular diameter of the electrode which in turn is of course directly related to the required amperage requirements. The diameter of the electrode should be selected to conveniently carry the required amperage without becoming contaminated, such as would otherwise occur and prevent establishment of a proper arc.

The present invention, as also previously noted, may be employed to automatically join the end of the coils in a wound rotor for connection to the collector rings. In one such application, it was found that a single elongated weld on the central portion of each end connection was preferably first formed by manual welding, with the weld then completed by applying spot welds to the opposite ends with the automatic spot welding method and apparatus of the present invention as shown in FIGS. 1 – 12.

The present invention has been found to provide a highly satisfactory arc spot welding process and apparatus for interconnecting of the end coil connection means to the end contact means of cylindrical elements, such as armatures, rotors, and the like. The procedure and apparatus particularly with the multiple, radially spaced welds provides a very convenient, inexpensive, and rapid means of the end connections in a practical commercial production line and with personnel of minimum skill requirements.

I claim:

1. In an apparatus for welding of coil lead means of an electric machine cylindrical element comprising a fixture means for supporting of an element with ends of the coil lead means in a predetermined planar relation, a non-consumable electrode arc spot welding torch means located adjacent the end of the element in spaced relation to said ends, means to establish relative movement between the element and the torch means, and control means to sequentially actuate said torch means in response to alignment of the torch means with the coil lead means to establish a welding arc between the torch and the aligned coil lead means.

2. The apparatus of claim 1 wherein said torch means includes a tungsten electrode, and means to supply a protective inert gas atmosphere about the end of the electrode.

3. The apparatus of claim 2 wherein said electrode is a two percent thoriated tungsten, and said gas is helium.

4. The apparatus of claim 1 wherein said electrode end is tapered to an essentially flat blunt end.

5. The apparatus of claim 1 wherein said torch means includes a tungsten electrode having a pencilled end terminating in a flat blunt end having a lateral diameter essentially within the range of 1/32 to 1/16 inches, and means to establish a helium protective atmosphere.

6. The apparatus of claim 1 having a sliding ground contact means for said torch means, and means to mount said contact means in sliding contact with the lead means.

7. The apparatus of claim 6 wherein said contact means is maintained in engagement with coil means being spot welded and immediately adjacent to the end.

8. The apparatus of claim 1 having a timing means connected to control the on-time of said torch means to create a corresponding arc, means to continuously rotate said cylindrical element, and sensing means responsive to alignment with each of said end connections to actuate said timing means and energize said torch means.

9. The apparatus of claim 8 wherein said timing means included a control relay, a power supply for operating of said control relay and having said sensing elements connected in series with said power supply and said control relay.

10. The apparatus of claim 8 wherein said torch means includes a 2 per cent thoriated tungsten electrode terminating in a blunt, essentially flat end of diameter between 1/32 and 1/16 inches and having means to supply a protecting helium gas about the end and adjacent arc, said fixture includes a rotating base support unit having means to support the element projecting axially upwardly to locate said connection legs in a common horizontal plane, a top support unit including horizontal and vertical guide means engaging the top end and adjacent side portion of the element, said guide means being adjustably mounted to accommodate varying size elements, means connected to said top support unit for adjustably mounting of said torch means relative to said coplanar end connection.

11. The apparatus of claim 10 including a ground contact located in alignment with said torch means and slideably engaging the periphery of the coil lead means immediately adjacent to the torch means.

12. The apparatus of claim 8 including a DC welding power supply having a constant output instantly applied to the torch in response to activation of the timing means and maintained for a selected time.

13. An apparatus for welding of a plurality of circumferentially spaced coil connections in an essentially common radial plane, comprising a torch means mounted to traverse said radial plane, said torch means including a two percent thoriated tungsten electrode and gas shielding means, a constant potential welding supply connected to energize said electrode and having a source of helium shielding gas, said welding supply being continuously energized to establish a welding potential at an output means, a timing means operable to initially complete the connection of the output means to the torch means, and conductive sensing means mounted to traverse said connecting means and slideably engaging said connection means to produce control signals in response to the sequential alignment with each coil connection, and means connecting the sensing means to actuate the timing means.

14. The apparatus of claim 13 wherein said welding supply is a high frequency direct current supply, and said timing means includes a power supply separate from said welding supply.

15. In an apparatus for welding of coil lead means to copper commutating bars of a dynamoelectric machine element, comprising a fixture means for supporting of a rotor element, a non-consumable electrode arc spot welding torch means, means to establish relative movement between the rotor element and the torch means, and control means to sequentially actuate said torch means in response to alignment of the torch means with a commutating bar to establish a welding arc between the torch and the aligned commutating bar.

16. The apparatus of claim 15 wherein said commutating bars are individual, L-shaped members having a short radial connection leg aligned with an axially extended rotor conductor, said leg having the rotor conductors exposed on the axial end face of the connecting legs, a support unit including horizontal and vertical guide means engaging the end and adjacent side portion of the L-shaped members, means connected to said support unit for adjustably mounting of said torch means relative to said coplanar connection legs, a ground contact means resiliently engaging the outer circumference of the connection leg, and a pair of sensing elements mounted to resiliently engage a single commutator bar and having a width no greater than the interbar insulator to open the circuit therebetween as each interbar insulator passes the sensing elements, and a timing means having an input means connected to said sensing means and connected to control the on-time of said torch to create a corresponding arc.

17. The apparatus of claim 16 wherein said torch includes a tungsten electrode and means to supply a protective helium gas atmosphere about the end of the electrode.

18. The apparatus of claim 16 wherein said torch means has an electrode, said electrode end being tapered to an essentially flat blunt end.

19. The apparatus of claim 16 wherein said torch includes a tungsten electrode having a pencilled end terminating in a flat blunt end having a lateral diameter essentially within the range of 1/32 to 1/16 inches.

20. The apparatus of claim 16 wherein said timing means includes a control relay, a power supply for operating of said control relay and having said sensing elements connected in series with said power supply and said control relay.

21. The apparatus of claim 16 wherein said sensing elements are spring-loaded conductive plungers mounted in vertical alignment, attachment means for said plungers connected to said support means and locating said plungers in alignment with a commutating bar in synchronism with location of the torch means with a commutating bar.

22. The apparatus of claim 16 wherein said commutating bars have split connection legs and said lead means are strips extended within said bars and exposed in the outer surface of said connection portions, and said spot welds being formed on each outer surface of each of said bars integrally connecting each rotor conductor to the corresponding commutating bars.

23. The method of spot welding of the end conductors of the coils in a slotted cylindrical rotor to a commutator having circumferentially spaced commutator bars separated by insulating members, comprising continuously moving a torch means relative to the commutating bars in spaced welding relation to each of said bars, simultaneously moving a conductive sensing means around said commutator in operative sensing relation to said bars, and activating said torch means for a predetermined time in response to the sensing of each commutator bar.

24. The method of claim 23 including the step of continuously energizing a welding supply to establish a welding potential at an output means and activating said torch means by completing a connection of the supply to the torch means.

25. The method of claim 23 including the steps of establishing a plurality of radially spaced welded connections to each of said commutator bars by sequentially circumferentially traversing of said bars at least twice and establishing a selected spot weld connection during each traverse.

* * * * *